Patented June 18, 1940

2,205,239

UNITED STATES PATENT OFFICE 2,205,239

PROCESS FOR PREPARING CYANO-2-BUTADIENE-1,3

Albert S. Carter and Frank Willard Johnson, Wilmington, Del., assignors to E. I. du Pont de Nemours & Company, Wilmington, Del., a corporation of Delaware No Drawing. Application November 19, 1938, Serial No. 241,398

21 Claims. (Cl. 260—86)

This invention relates to dehydration of unsaturated compounds. More particularly, it relates to cyano-2-butadiene-1,3 and a method for its preparation.

In DRP 622,800 the pyrolysis of cyano-dihydrobenzene or cyano-tetrahydrobenzene is described. The product is said to be a cyanobutadiene but no further description of it is given. French Patent 820,188 (British equivalent 482,300) discloses the reaction of HCN with methyl vinyl ketone to form either levulinic nitrile or alpha vinyl lactic nitrile according to conditions. The formation of cyano-4-butadiene-1,3 has been disclosed in U. S. Patent 2,073,363 and in J. Amer. Chem. Soc. 57, 1981 (1935).

It is an object of this invention to prepare cyano-2-butadiene-1,3. A more specific object is to prepare cyano-2-butadiene-1,3 from alpha vinyl lactic nitrile. A further object is to polymerize cyano-2-butadiene-1,3 in the presence or absence of other polymerizable materials such as chloro-2-butadiene-1,3. A still further object is to obtain rubber-like materials of novel properties by polymerization of cyano-2-butadiene-1,3. Other objects will appear hereinafter.

These objects are accomplished by converting alpha vinyl lactic nitrile into an acid ester and then submitting this product to temperatures sufficiently high to split out the elements of the acid, simultaneously forming cyano-2-butadiene-1,3. The cyano-2-butadiene-1,3 may then be polymerized alone or in the presence of other materials including other polymerizable materials.

Alpha vinyl lactic nitrile is obtainable by the addition of HCN to methyl vinyl ketone at temperatures below 15° C. in the presence of alkaline condensing agents, as described in French Patent 820,188 and British Patent 482,300, both of which are mentioned above. This compound is relatively unstable and if heated the HCN is again split off and the starting materials are regained. It has been found, however, that by converting the unstable cyanhydrin to an acid ester it is possible to heat this derivative without HCN being eliminated. Instead, the elements of the acid (corresponding to the elements of water in the cyanhydrin) are removed and cyano-2-butadiene-1,3 is formed.

According to the preferred procedure, the alpha vinyl lactic nitrile is converted to the acetate by treating the nitrile with an acetylating agent, such as acetyl chloride, acetic anhydride, or ketene. Other acylating agents such as propionyl or butyryl chloride, benzoyl chloride, para-toluenesulfonyl chloride, etc., may be used. The preferred temperature range for cracking the acetate is between 400° C. and 500° C. but some cyano-2-butadiene-1,3 can be obtained both above and below these temperatures. The preferred method for carrying out the pyrolysis involves leading the vapors of the acid ester from the hot zone either after dilution with an inert gas such as nitrogen or at reduced pressure. Reduced total pressure can be employed along with nitrogen dilution to produce more favorable reaction conditions but this combination is not preferred because it requires larger equipment to obtain the desired contact time and makes isolation of the products more difficult.

The following examples describing in detail the carrying out of this invention are given for the purpose of illustration alone and accordingly they are not intended to be construed as limiting the scope of the invention. Wherever in these examples the term "parts" is used it is intended to mean "parts by weight" unless otherwise indicated.

Example 1

A mixture of 428 parts of acetic anhydride and 5 parts of acetyl chloride were heated to the boiling point under a reflux condenser and 388 parts of alpha vinyl lactic nitrile were run in at such a rate that refluxing was maintained by the heat of reaction. After the nitrile was all added, the mixture was heated half an hour longer and then fractionated at reduced pressure. The fraction boiling between 89° C. and 90° C. at 17 mm. was collected. The acetate boils at 194° C. to 195° C. at atmospheric pressure without appreciable decomposition.

A mixture of equal parts by volume of pure dry nitrogen and of alpha vinyl lactic nitrile acetate vapor (prepared as described in the preceding paragraph) was passed thru a tube packed with glass rings maintained at 450° C. to 465° C. at such a rate that the contact time (based on the entering gases) was about 14 seconds. After leaving the hot zone the gases were immediately cooled to —70° C. The condensate was washed with water to remove the acetic acid, dried over $Na_2SO_4$, and distilled from an oil bath at 4 mm. pressure. The product that distilled below room temperature was re-washed with water containing a little hydroquinone to retard polymerization, dried and redistilled. After a small foreshot the fraction boiling between 37° C. and 39° C. at 34 mm. was collected. Some polymerization occurred in the still and the viscous residue set to a rubbery mass after a few hours. The distillate contained 16.81% N, theory for C₅H₅N=17.72%. Refractive index at 20° C.=1.447, density=0.859. MK (found) 24.65. MK (calculated) 24.22.

*Example 2*

The distillate from Example 1 was exposed to ultra-violet light. The product gradually thickened and became viscous and finally set to a clear, colorless rubbery mass after about 24 hours. It was also rapidly polymerized by heat, leaving a large portion as a rubbery still residue upon distillation of the pure material at 35° C. to 50° C. When partially polymerized (about 50%), then coagulated by pouring into alcohol, a tough rubber was obtained that could be cured in the usual manner. The distillate was also polymerized by emulsifying it to form a 30% emulsion in 4% sodium abietate solution in the usual manner and then allowing it to polymerize while so dispersed.

*Example 3*

A mixture of 90 parts of chloro-2-butadiene-1,3 and 10 parts of cyano-2-butadiene-1,3 in which a small amount of sulfur had been dissolved was emulsified in such a quantity of 4% aqueous sodium abietate solution as to form a 30% emulsion and then polymerized while so dispersed according to the procedure disclosed in a copending application of Collins Serial No. 204,305, filed April 26, 1938. After compounding and curing the product was found to exhibit a high degree of solvent resistance.

As has already been indicated, to some extent the invention is not limited to the procedure described in the above examples. This procedure may be widely varied without exceeding the scope of the invention. Thus, in place of an acetylating agent as used in the examples, other acylating agents may be used as disclosed above. For example, other carboxylic acid esters may be formed. These esters may be prepared according to known methods for forming acid esters of unsaturated nitriles. A preferred temperature for cracking the acetate has been given above and it has been pointed out that even for cracking the acetate other temperatures both higher and lower may be used. This temperature range is illustrative. The ranges for the other esters both preferred and limiting will vary but can be readily determined by a simple experiment, as will be obvious to those skilled in the art. Altho the pyrolysis is preferably carried out by leading the vapors of the acid ester thru the hot zone at reduced pressure, it is within the scope of the invention to employ instead atmospheric or even higher pressures. Furthermore, it is not necessary that the vapor be diluted with nitrogen. It may be subjected to the cracking operation in the undiluted state or it may be diluted with some other inert gas. The hot zone may be empty, packed with an inert heat conducting material, or an acid acceptor may be used. The cyano-2-butadiene-1,3 obtained may be purified in any desired manner or to any desired extent. The above examples indicate a preferred method for bringing about this purification. It may be pointed out that, while it is desirable to have an inhibitor of polymerization present during the working up of the crude product of the pyrolysis, it is not necessary that hydroquinone be used. Other inhibitors of polymerization may be substituted for the hydroquinone.

The cyano-2-butadiene-1,3 polymerizes spontaneously and therefore it may be polymerized according to any of the procedures known to the art for carrying out the polymerization of the spontaneously polymerizable materials. A number of these have been illustrated in Examples 2 and 3.

As is indicated in the examples, the present invention provides a method for preparing a novel material which is capable of being converted into rubber-like materials either with or without the addition of other ingredients which modify the properties of the resulting rubber. An outstanding advantage of the invention is that it makes possible the preparation of polymers of chloro-2-butadiene-1,3 having a high degree of solvent resistance. Other advantages of the invention will be apparent from the above description. This novel rubber-like material has a broad field of utility as a substitute for natural or other synthetic rubbers.

It is apparent that many widely different embodiments of this invention may be made without departing from the spirit and scope thereof and therefore it is not intended to be limited except as indicated in the appended claims.

We claim:

1. A process for preparing cyano-2-butadiene-1,3, which comprises acylating alpha vinyl lactic nitrile and then pyrolyzing the resulting acid ester to remove the elements of the corresponding acid.

2. A process for preparing cyano-2-butadiene-1,3, which comprises acetylating alpha vinyl lactic nitrile and then pyrolyzing the resulting acid ester to eliminate the elements of acetic acid.

3. The process of claim 2, further characterized in that the pyrolysis is carried out at a temperature between about 400° C. and about 500° C.

4. A process for preparing cyano-2-butadiene-1,3, which comprises acetylating alpha vinyl lactic nitrile, then subjecting a mixture of the acid ester so formed and of nitrogen to a temperature between about 400° C. and about 500° C. to eliminate the elements of acetic acid.

5. The process of claim 4, further characterized in that the heat treatment is carried out by passing the acid ester-nitrogen mixture thru a tube packed with an inert heat conducting material.

6. A process for preparing cyano-2-butadiene-1,3, which comprises acetylating alpha vinyl lactic nitrile by refluxing a mixture of it with acetic anhydride, then separating the acid ester, mixing it with about an equal amount of pure dry nitrogen, and then passing the mixture thru a tube packed with glass rings and maintained at about 450° C. to about 465° C. at such a rate that the contact time, based on the entering gases, is about 14 seconds, then immediately cooling the gases after they are removed from the hot zone to a temperature of about −70° C. and thereafter isolating the cyano-2-butadiene-1,3.

7. A process for preparing cyano-2-butadiene-1,3, which comprises pyrolyzing an acid ester of alpha vinyl lactic nitrile to remove the elements of the corresponding acid.

8. A process for preparing cyano-2-butadiene-1,3, which comprises pyrolyzing the acetic acid ester of alpha vinyl lactic nitrile to remove the elements of acetic acid.

9. The process of claim 8, further characterized in that the pyrolysis is carried out at a temperature between about 400° C. and about 500° C.

10. A process for preparing cyano-2-butadiene-1,3, which comprises subjecting a mixture of the acetic acid ester of alpha vinyl lactic nitrile and nitrogen to a temperature between about 400° C. and about 500° C. to eliminate the elements of acetic acid.

11. Cyano-2-butadiene-1,3.

12. A polymer of cyano-2-butadiene-1,3.

13. A polymer formed by polymerizing a mixture of cyano-2-butadiene-1,3 and chloro-2-butadiene-1,3.

14. A polymer formed by polymerizing a mixture of cyano-2-butadiene-1,3 and chloro-2-butadiene-1,3 while the mixture is dispersed in an aqueous medium in the presence of a small amount of sulfur.

15. The process which comprises polymerizing cyano-2-butadiene-1,3.

16. The process which comprises polymerizing a mixture of cyano-2-butadiene-1,3 and chloro-2-butadiene-1,3.

17. The process which comprises dissolving a small amount of sulfur in a mixture of cyano-2-butadiene-1,3 and chloro-2-butadiene-1,3 and then polymerizing the mixture while it is dispersed in an aqueous medium in the presence of the sulfur.

18. A process for preparing cyano-2-butadiene-1,3, which comprises acetylating alpha vinyl lactic nitrile, then subjecting the acid ester so formed to a temperature between about 400° C. and about 500° C. at reduced pressure to eliminate the elements of acetic acid.

19. A process for preparing cyano-2-butadiene-1,3, which comprises subjecting the acetic acid ester of alpha vinyl lactic nitrile to a temperature between about 400° C. and about 500° C. at reduced pressure to eliminate the elements of acetic acid.

20. A process for preparing cyano-2-butadiene-1,3, which comprises forming an acid ester of alpha vinyl lactic nitrile and then pyrolyzing the resulting acid ester to remove the elements of the corresponding acid.

21. A process for preparing cyano-2-butadiene-1,3, which comprises pyrolyzing a saturated and unsubstituted aliphatic carboxylic acid ester of alpha vinyl lactic nitrile to remove the elements of the corresponding acid.

ALBERT S. CARTER.
F. WILLARD JOHNSON.